US010829061B2

(12) United States Patent
Petley

(10) Patent No.: US 10,829,061 B2
(45) Date of Patent: Nov. 10, 2020

(54) THERMALLY INSULATING PANEL FOR A VEHICLE

(71) Applicant: JAGUAR LAND ROVER LIMITED, Warwickshire (GB)

(72) Inventor: Dean Petley, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 104 days.

(21) Appl. No.: 16/060,461

(22) PCT Filed: Dec. 8, 2016

(86) PCT No.: PCT/EP2016/080289
§ 371 (c)(1),
(2) Date: Jun. 8, 2018

(87) PCT Pub. No.: WO2017/097917
PCT Pub. Date: Jun. 15, 2017

(65) Prior Publication Data
US 2018/0361952 A1 Dec. 20, 2018

(30) Foreign Application Priority Data
Dec. 9, 2015 (GB) .................................. 1521659.1

(51) Int. Cl.
*B62D 25/10* (2006.01)
*B60R 13/08* (2006.01)
*F02B 77/11* (2006.01)

(52) U.S. Cl.
CPC ...... *B60R 13/0876* (2013.01); *B60R 13/0869* (2013.01); *F02B 77/11* (2013.01); *B60R 2013/0807* (2013.01)

(58) Field of Classification Search
CPC .... B60R 13/0838; B62D 25/10; B62D 25/105
See application file for complete search history.

(56) References Cited

U.S. PATENT DOCUMENTS

| | | | | |
|---|---|---|---|---|
| 2014/0216697 A1* | 8/2014 | Krus | ................... | B60R 13/0876 165/135 |
| 2015/0158267 A1* | 6/2015 | Stuckey | .................. | B32B 3/266 428/138 |
| 2015/0260075 A1* | 9/2015 | Schweiggart | ........... | F16L 59/08 165/185 |

FOREIGN PATENT DOCUMENTS

| | | |
|---|---|---|
| CN | 203255095 U | 10/2013 |
| DE | 202011109219 U1 | 12/2012 |

(Continued)

OTHER PUBLICATIONS

International Search Report and Written Opinion of the International Searching Authority for International application No. PCT/EP2016/080289 dated Mar. 16, 2017.

(Continued)

*Primary Examiner* — Bryan A Evans
(74) *Attorney, Agent, or Firm* — Carlson, Gaskey & Olds

(57) ABSTRACT

An engine system (200) for a vehicle comprising: a powertrain component (120); a second vehicle component (130); a fixing (140) joining the powertrain component (120) to the second vehicle component (130); a thermally insulating panel (100) comprising at least one uncompressed area (104) extending over at least a portion of the powertrain component (120) to at least partially thermally insulate the powertrain component (120) and comprising at least one precompressed area (106) for providing a rigid mounting position to mount the vehicle component (130) to the powertrain component (120), the rigid mounting position to be located at a potential thermal bridge between the powertrain component (120) and the second vehicle component (130) such that it forms a thermal insulating layer between the powertrain component (120) and the second vehicle component (130).

19 Claims, 5 Drawing Sheets

(56) References Cited

FOREIGN PATENT DOCUMENTS

| | | |
|---|---|---|
| EP | 2070771 A1 | 6/2009 |
| JP | H08276796 A | 10/1996 |
| JP | H1120571 A | 1/1999 |
| JP | 6249030 B2 * | 3/2014 |
| WO | 2011/038338 A2 | 3/2011 |

OTHER PUBLICATIONS

Combined Search and Examination Report under Sections 17 and 18(3) for Application No. GB1521659.1 dated Jun. 8, 2016.
Combined Search and Examination Report under Sections 17 and 18(3) for Application No. GB1620890.2 dated May 11, 2017.
Examination Report under Section 18(3) for Application No. GB1521659.1 dated Mar. 27, 2018.

* cited by examiner

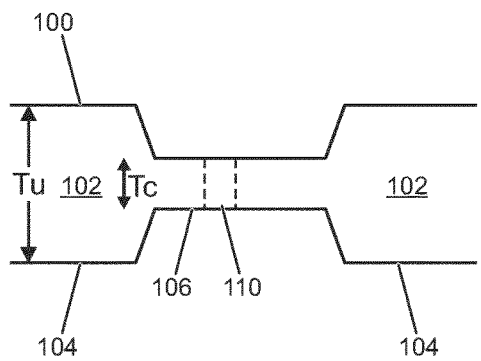
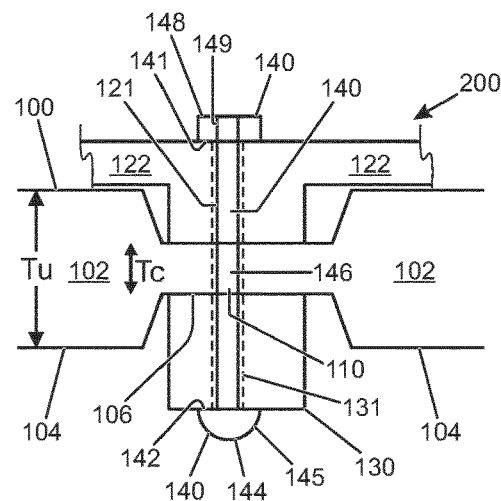
Fig 1A            Fig 1B
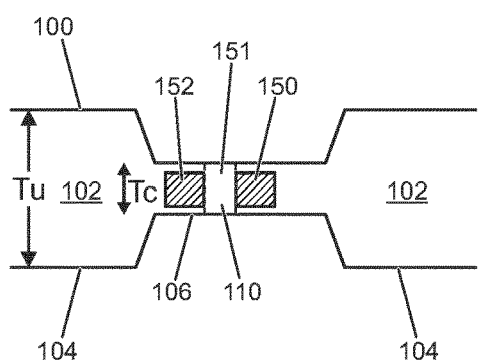
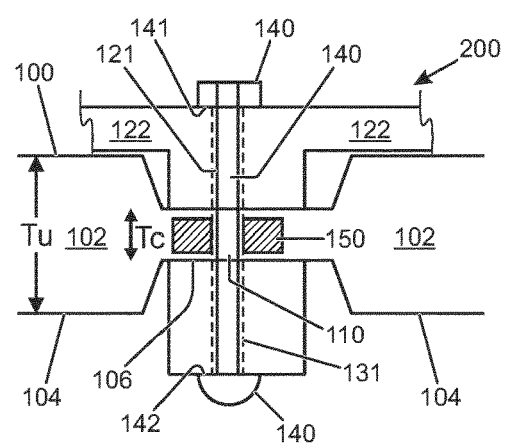
Fig 2A            Fig 2B
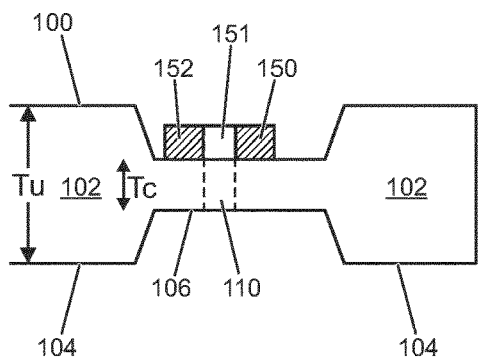
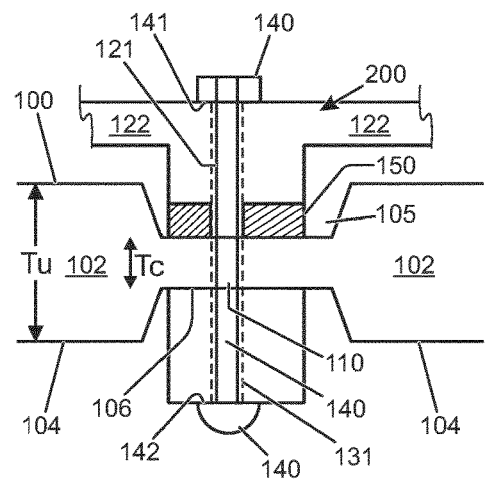
Fig 3A            Fig 3B

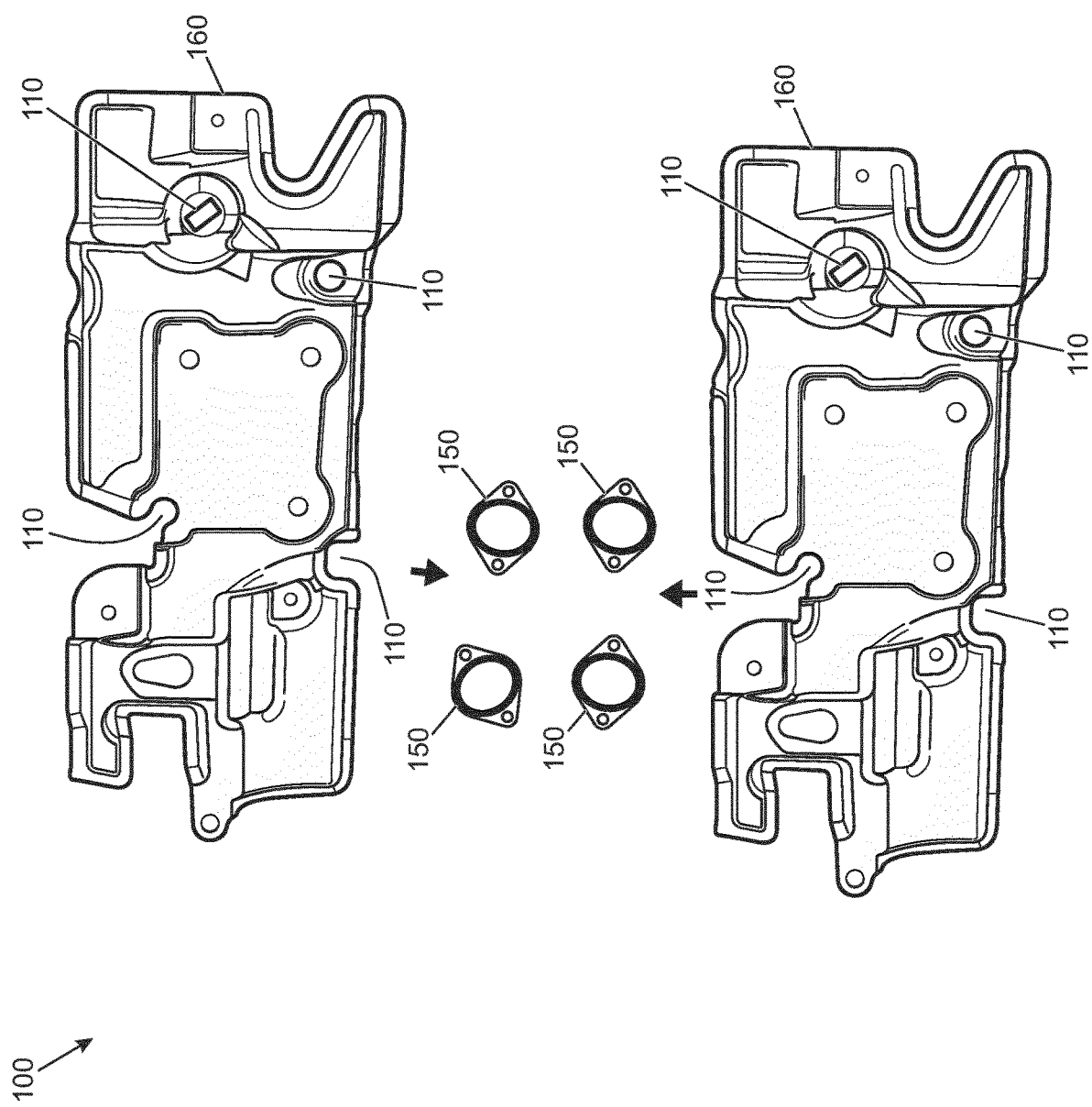

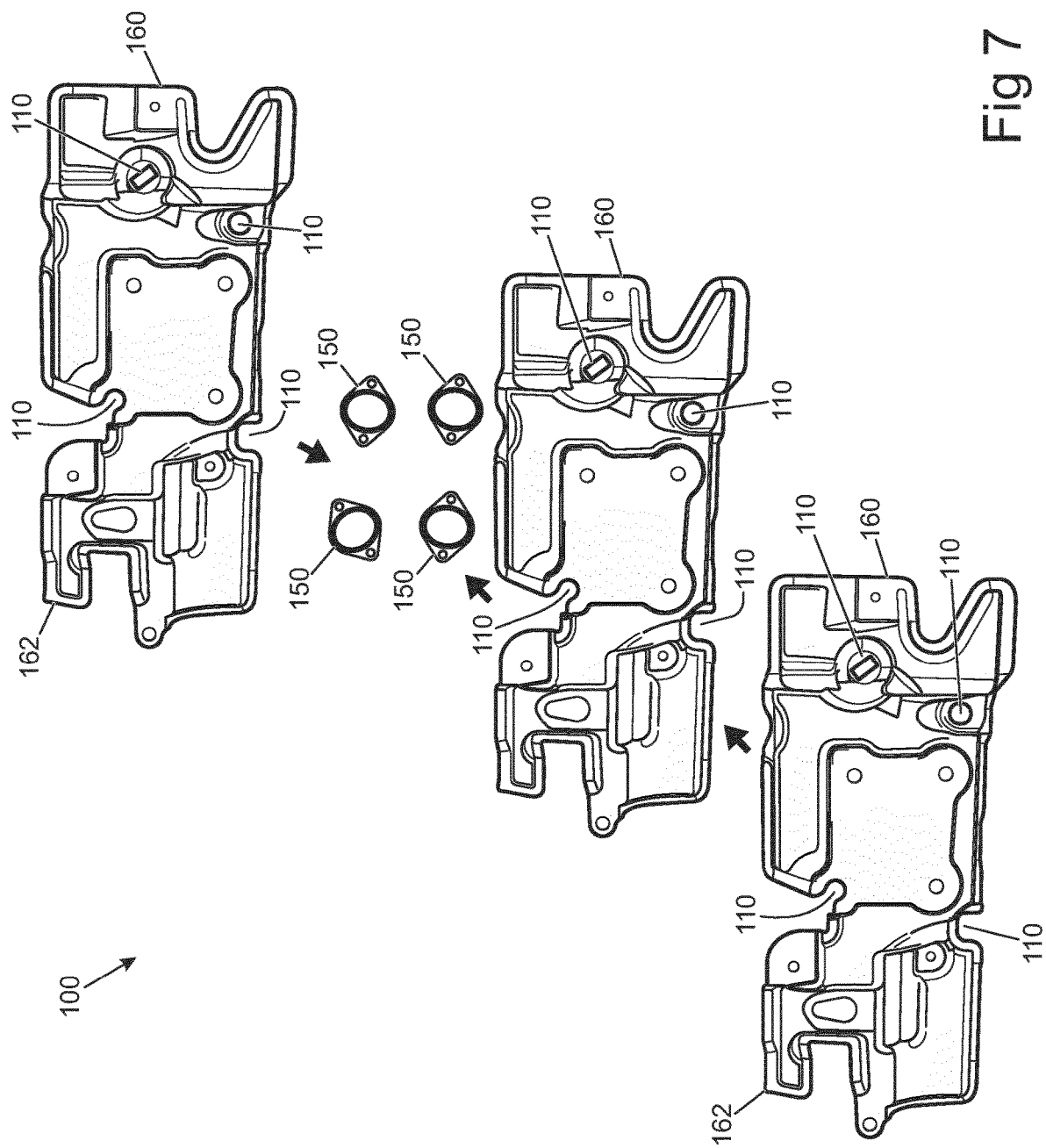

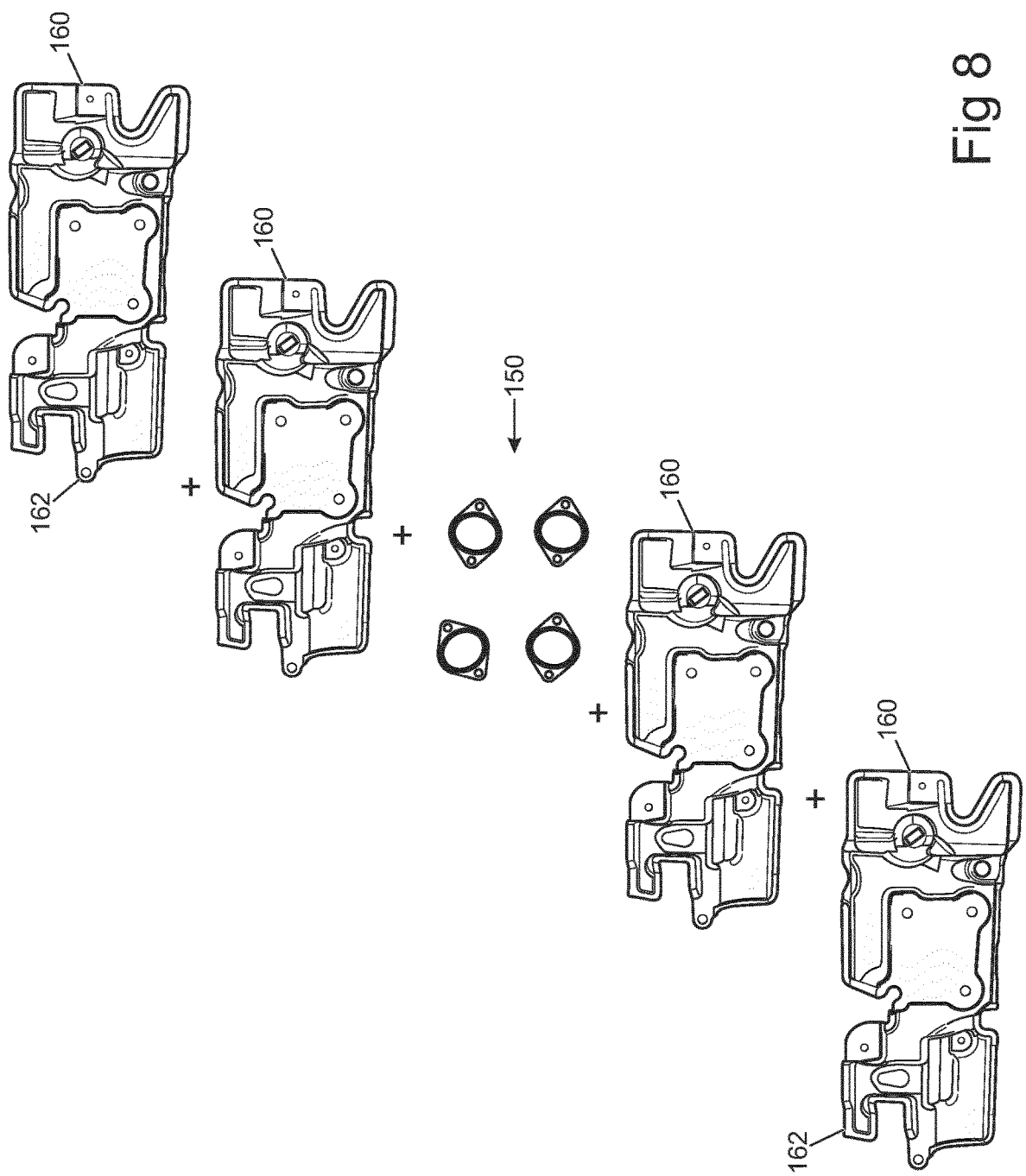

THERMALLY INSULATING PANEL FOR A VEHICLE

TECHNICAL FIELD

The present disclosure relates to a thermally insulating panel for a vehicle. In particular, but not exclusively it relates to a thermally insulating panel in a powertrain system.

BACKGROUND

It can be desirable in a vehicle to restrict heat transfer to or from certain components, for example those that have a preferred operating temperature. Heat transfer may be controlled, for example, by using encapsulating a component using thermally insulating panels which cover at least portions of the component it is desired to keep warm or cool. These panels are designed to reduce heat transfer between the component and the ambient environment or other parts of the vehicle. Such panels may additionally provide acoustic attenuation to reduce the transmission of airborne noise from a component to the vehicle occupants or outside the vehicle.

However, in order to reduce manufacturing complexity of vehicles it is often necessary to attach one component to another, often within small engineering tolerances. The consequent direct abutment of the components often creates thermal bridges which may allow heat to transfer between the vehicle components. It is often not possible to encapsulate the two attached components or it is preferable to encapsulate only one component, it these circumstances, the thermal bridge acts to provide a heat sink and the efficiency of the encapsulation is reduced.

It is an aim of the present invention to better restrict heat transfer between vehicle components considering the complex and precise geometry of some interconnecting vehicle components.

SUMMARY OF THE INVENTION

Aspects and embodiments of the invention provide; a thermally insulating panel for use in a vehicle, a system comprising a thermally insulating panel and a vehicle comprising a thermally insulating panel as claimed in the appended claims.

It will generally be appreciated by those skilled in the art that the powertrain of a vehicle comprises an engine, induction system, exhaust system, cooling system, transmission and driveline with associated control systems and controllers. Additionally or alternatively the powertrain may comprise an electric traction motor, inverter, battery and/or auxiliary power unit with associated control systems and controllers.

An aspect of the invention is to create a new type of thermally insulating panel for a vehicle which has been specifically designed so that it reduces the thermal bridging between a first vehicle component and a second vehicle component that are fixed together particularly where a powertrain for a vehicle comprises the components. The first vehicle component may be a powertrain component and the second vehicle component may be any other vehicle component that is in contact with or coupled to the powertrain component such as a support mount as described below. This reduction in thermal bridging is achieved by extending the thermally insulating panel between the first vehicle component and the second vehicle component so that it is between the contacting points or faces of the first vehicle component and the second vehicle component. The thermally insulating panel, partially or fully, thermally decouples the first vehicle component and the second vehicle component.

In this document, the description of joining a first vehicle component to a second vehicle component is synonymous with joining the second vehicle component to the first vehicle component. Neither implies a direction or sense in which a fixing is used.

The description of joining the second component to the first component does not require a direct abutting contact between the components. However, in at least some embodiments direct abutting contact would occur or potentially occur in the absence of the thermally insulating panel between the vehicle components. Similarly, the design of either the first, the second, or both components may be adapted to allow for the spacing provided by the thermally insulating panel.

The thermally insulating panel may be provided as an independent product, separately to a powertrain or a vehicle.

The thermally insulating panel is pre-compressed in the area that forms the contact point or surface between the powertrain component and the vehicle component so that it is more rigid in this area. This allows the use of a thermally insulating panel in situations which previously had not been possible because of the need to attach components to one another in a rigid manner.

Herein, pre-compressed refers to an area of the panel that is constructed from the same material as the rest of the panel and in some embodiments from the same laminated layers. However, during the construction of the panel this area has been subject to a compressive force that compacts the material or the material layers and provides an area that is thinner and denser than the uncompressed area(s) of the panel. This is in contrast to some types of insulating panels whose depth is reduced by the removal of material in some areas resulting in an area which is thinner than and has uniform density with the uncompressed area(s) of the panel.

According to some but not necessarily all embodiments of the invention there is provided a thermally insulating panel comprising: panel material configured to provide thermal insulation to a powertrain component, wherein the panel material comprises at least one uncompressed area and at least one pre-compressed area, wherein the pre-compressed area provides a rigid mounting position to mount a vehicle component to the powertrain component, the rigid mounting position to be located at a thermal bridge between the powertrain component and the vehicle component, and wherein the thermally insulating panel defines at least part of an aperture through the panel material in the pre-compressed area for receiving a fixing for joining the powertrain component to the vehicle component.

Metal components of the powertrain transfer heat to other components mounted thereto, the contact surfaces act to create a thermal bridge. This invention seeks to provide an insulating layer between the contact surfaces of the components without compromising the rigidity of the connection.

Further, the panel material may be configured to provide thermal insulation between a powertrain component and a vehicle component, wherein the panel material comprises at least one uncompressed area and at least one pre-compressed area, wherein the pre-compressed area is sized and positioned to be located between two potentially contacting points or surfaces of the powertrain component and the vehicle component. Optionally, the thermally insulating panel comprises an aperture through the panel material in the pre-compressed area for receiving a fixing for attaching the powertrain component and vehicle component.

According to another embodiment of the present invention, there is provided a thermally insulating panel comprising an uncompressed area and a pre-compressed area defining two opposed mounting surfaces whereby in use, a component mounted on one mounting surface is rigidly connected yet thermally isolated from a component mounted on the opposing mounting surface, the panel providing a thermal decoupling of the two components. In this embodiment, two opposing components may be rigidly connected to the insulating panel by a common fixing that extends through an aperture in the panel.

In all of the above noted embodiments, the thermally insulating panel in the pre-compressed area may have a consistent thickness, be substantially incompressible and substantially more rigid than the uncompressed area in use having been pre-compressed. This allows the use of a thermally insulating panel at a contacting point or surface between two vehicle components which previously had not been possible because of the need to attach components to one another rigidly and within small engineering tolerances. The pre-compressed area provides rigid connection of two components that together would, without the insulating panel, form a thermal bridge at a contacting point or face. The pre-compressed area being incompressible and rigid to form a mounting point for the two components where if the panel were uncompressed the area would be compressible and not rigid and therefore not a suitable to act as rigid connection between the two components.

In some embodiments, a gasket is also embedded within or attached to the thermally insulating panel within the pre-compressed area in alignment with the aperture. A fixing attaching the vehicle component and the powertrain component can pass through the gasket and the aperture. This is a complimentary part and enhances the thermal insulation and/or the rigidity of the connection at that point.

The thermally insulating panel may therefore comprise a gasket within the pre-compressed area or adjacent a surface of pre-compressed area of the thermally insulating panel and partially or fully circumscribing the aperture.

In some embodiments, the gasket is used as a spacer to achieve a controlled spacing between the powertrain component and the vehicle component.

In some but not necessarily all embodiments, the gasket may be a rigid gasket that does not deform or does not deform more than 2% under compression when in use.

In some but not necessarily all embodiments, the gasket may be a thermally insulating gasket.

In some but not necessarily all embodiments, the gasket may be formed from rubber or nylon but many other materials and composite materials are known to provide the benefits of the gasket herein.

The thermally insulating panel may be provided as part of a powertrain of a vehicle. For example, according to some but not necessarily all embodiments of the invention there is provided a system comprising: a powertrain component; a vehicle component; a fixing joining the powertrain component to the vehicle component; and the thermally insulating panel comprising an aperture through which the fixing passes wherein one or both of the components is a part of an engine and the engine is configured for use in a vehicle.

In this example, the thermally insulating panel may extend between the powertrain component and the vehicle component such that it forms a thermal insulating layer between the powertrain component and the vehicle component. The uncompressed area of the thermally insulating panel may extend over at least a portion of the powertrain component to at least partially thermally insulate the powertrain component. The pre-compressed area of the thermally insulating panel may extend between the powertrain component and the vehicle component such that it forms a thermal insulating layer between the powertrain component and the vehicle component.

The fixing joining the powertrain component to the vehicle component and extending through the aperture, may be thermally insulated to prevent a thermal bridge forming, when in use, through the fixing between the powertrain component and the vehicle component.

For example, the fixing may have a first contact surface for contacting, in use, the powertrain component. The first contact surface may be a thermally insulated surface.

For example, the fixing may have a second contact surface for contacting, in use, the vehicle component. The second contact surface may be a thermally insulated surface.

In one example, the fixing comprises a bolt comprising a head and a shaft with a screw thread and a nut comprising a threaded aperture for receiving the thread of the bolt shaft. The powertrain component and the vehicle component are compressed between an abutment surface of the head of the bolt and an opposing abutment surface of the nut. In some examples, the abutment surface of the head of the bolt is thermally insulated. In some examples, the abutment surface of the nut is thermally insulated. In some examples, the shaft of the bolt is thermally insulated. Thermal insulation may, for example, be achieved by using a nylon or other coating. Similarly, the thermal insulation for the fixing may be provided as a coating on either the powertrain component or vehicle component or be provided as a bush or washer between the fixing and either the powertrain component or the vehicle component.

The term thermally insulated when applied to something indicates that it does not easily transfer thermal energy via conduction, convention or radiation. In particular, thermally insulated in the context of this document, when applied to something indicates that it does not easily transfer thermal energy via conduction preventing or inhibiting a thermal bridge between the powertrain and vehicle components The term thermally insulated in some but not necessarily all examples implies thermal transfer by conduction of less than 0.045 W/mK at 20° C.

In some embodiments, a thermally insulated or encapsulated vehicle component is covered by the insulating panel such that heat cannot escape through convection and the heated air is trapped under the insulating panel.

The thermally insulating panel may be formed from a single layer or from multiple layers. The multiple layers may be multiple laminate layers arranged in parallel.

Examples of a suitable layer or layers include: polyurethane foam, felt. The felt may be formed from glass fibres, natural fibres. Pressurized steam molding may be used to manufacture the thermally insulating panel.

The thermally insulating panel may be a three dimensional rigid panel that conforms at least partially to a shape of the powertrain component and/or the vehicle component.

The thermally insulating panel may comprise an external rigid reinforcement layer on one or both sides of the vehicle thermal insulated panel. The thermally insulating panel may comprise a cellular layer and/or heat reflecting layer on an interior side of one or both of the external rigid reinforcement layers.

A reinforcement layer may be made from blended web of polyamide material in the form of powder or flakes and reinforcement fibres.

The thermally insulating panel may be adapted for acoustic insulation as well as thermal insulation, for example this may comprise a soft, acoustically absorbent, layer.

Although the invention has particular application to engines, where the vehicle component may be an engine mount, it also has application to other parts of a vehicle powertrain such as those parts of the vehicle where high temperature oil is stored, and/or for maintaining the working temperature of a battery or other temperature sensitive component.

One or both of the above-mentioned components, whether a powertrain component or any other component connected thereto, may be, for example, an engine component, an oil storage or oil circulation component, a temperature sensitive component, or an electrical energy storage component.

In some examples, the invention provides an engine system comprising: a powertrain component; a vehicle component; a fixing joining the powertrain component to the vehicle component; a thermally insulating panel extending in an uncompressed form over at least a portion of the powertrain component to at least partially thermally insulate the powertrain component and extending in a pre-compressed form between the powertrain component and the vehicle component such that it forms a thermally insulating layer between contacting points or surfaces of the powertrain component and the vehicle component, wherein the thermally insulating panel defines an aperture through which the fixing extendsoptionally, a thermal insulating gasket within or adjacent the thermally insulating panel at least partially circumscribes the fixing.

The gasket may be an integral part of the thermally insulating panel, for example being attached to a surface of the thermally insulating panel or being embedded within the thermally insulated panel. Alternatively, the gasket may be separate from the thermally insulating panel.

More generally, in some but not necessarily all examples, the invention provides a vehicle system comprising: a powertrain component that is a heat source; a vehicle component that is fixed to the powertrain component and is a heat sink; a fixing means interconnecting the powertrain component and the vehicle component; a thermally insulating panel extending over the powertrain component and between a contacting point or surface of the powertrain component and the vehicle component such that it forms a thermal insulation of the powertrain component and breaking the thermal bridge between the powertrain component and the vehicle component, wherein the thermally insulating means defines an aperture through which the fixing extends.

The thermally insulating means may extend in an uncompressed form over at least a portion of the powertrain component to at least partially thermally insulate the powertrain component and may extend in a compressed form between the powertrain component and the vehicle component such that it forms a thermally insulating layer between the powertrain component and the vehicle component. A thermally insulating gasket means may be used within or adjacent the thermally insulating means and partially or fully circumscribe the fixing means. The vehicle thermal insulating gasket means may be within or adjacent a surface of the compressed portion of the vehicle thermal insulating means through which the fixing means extends. The compressed portion may be a pre-compressed portion that is compressed before attachment to the system. Where used herein, pre-compressed area means an area compressed to a greater extent than the uncompressed area. The manufacture of the insulating panel may include the application of layers of insulating material to form the insulating panel which may then have pressure applied to it to form the layers into close relationship, this is the forming process of the panel, areas of which will then be pre-compressed before being installed onto the component(s) to be insulated.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 1A, 2A, 3A illustrate different examples of thermally insulating panels;

FIGS. 1B, 2B, 3B illustrate different examples of vehicle systems comprising thermally insulating panels between components;

FIGS. 6, 7 and 8 illustrate different examples of thermally insulating panels.

DETAILED DESCRIPTION

Figure 4A:
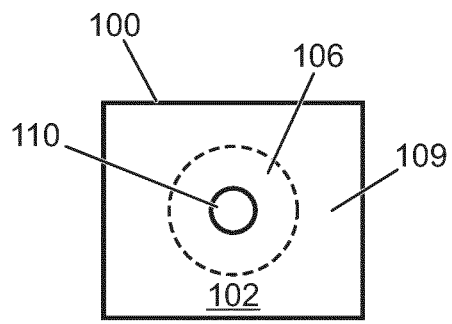
FIGS. 4A and 4B illustrate different examples of thermally insulating panels.

It can be desirable in a vehicle to restrict heat transfer to or from certain components, for example those that have a preferred operating temperature. Heat transfer may be controlled, for example, by using a thermally insulating panel which covers at least a portion of the component it is desired to keep warm or cool.

Because of the complex and precise geometry of vehicles it is often necessary to attach one component to another component often within small engineering tolerances. The consequent direct abutment of the components or indirect coupling via fixings may create a thermal bridge which, for example, allows heat to transfer between the vehicle components.

This description describes and the accompanying figures show a new type of thermally insulating panel 100 which has been specifically designed so that it reduces the thermal bridging between a powertrain component 120 (heat source), and a vehicle component 130 (heat sink), that are fixed together. This is achieved by extending the thermally insulating panel 100 between the powertrain component 120 and the vehicle component 130 so that it is sandwiched between the powertrain component 120 and the vehicle component 130. The thermally insulating panel 100, partially or fully, thermally decouples the powertrain component 120 and the vehicle component 130.

The thermally insulating panel 100 may be provided as an independent product, separately to a vehicle. FIGS. 1A, 2A, 3A illustrate examples of different vehicle thermally insulating panels 100. They are similar except that thermally insulating panels 100 illustrated in FIGS. 2A and 2B have at least one integrated gasket 150, whereas the thermally insulating panel 100 illustrated in FIG. 1A does not have an integrated gasket 150.

The thermally insulating panel 100 may be provided as part of a vehicle system 200 or may be added after the sale of the vehicle to a vehicle system 200. FIGS. 1B, 2B, 3B illustrate examples of the same vehicle system 200 using the respective different thermal insulating vehicle panels 100 of FIGS. 1A, 2A, 3A.

Referring to FIG. 1A, the thermally insulating panel 100 is pre-compressed in the area that will be between the powertrain component 120 and the vehicle component 130 so that it is thinner in this area. This allows the use of a vehicle thermally insulating panel 100 in situations which previously had not been possible because of the need to attach components to one another often within very small engineering tolerances.

This example of a thermally insulating panel 100 comprises panel material 102. The panel material 102 is configured to provide thermal insulation between a powertrain component 120 and a vehicle component 130, as illustrated in FIG. 1B.

The panel material 102 comprises at least one uncompressed area 104 and at least one pre-compressed area 106.

Herein, pre-compressed refers to an area of the panel that is constructed from the same material as the rest of the panel and in some embodiments from the same laminated layers. However, during the construction of the panel this area has been subject to a compressive force that compacts the material or the material layers and provides an area that is thinner and denser than the uncompressed area(s) of the panel. This is in contrast to some types of insulating panels whose depth is reduced by the removal of material in some areas resulting in an area which is thinner than and has uniform density with the uncompressed area(s) of the panel.

The pre-compressed area 106 is sized and positioned to be located between the powertrain component 120 and the vehicle component 130 in use, as shown in FIG. 1B.

The thermally insulating panel 100 defines an aperture 110, the aperture passing all the way through the panel material 102 in the pre-compressed area 106. This aperture 110 extends completely through the panel material 102 and is sized and positioned to receive a fixing 140 that is configured to fix the powertrain component 120 to the vehicle component 130.

The thermally insulating panel 100 in the pre-compressed area 106 may have a consistent thickness Tc less than a thickness Tu of the uncompressed area 104. For example, Tc may be less than half of Tu.

The pre-compression of the panel material 102, during manufacture of the thermally insulating panel 100, may for example have the beneficial effect that the pre-compressed area 106 is incompressible or substantially incompressible in use because it has been pre-compressed. this may enable use of a thermally insulating panel 100 in situations which previously had not been possible because of the need to attach components 120, 130 to one another consistently perhaps within small engineering tolerances.

Referring to FIG. 1B, the thermally insulating panel 100 illustrated in FIG. 1A is used in a vehicle system 200. The vehicle system 200 comprises: a powertrain component 120; a vehicle component 130; and a fixing 140 extending through the aperture 110 of the thermally insulating panel 100 and joining the powertrain component 120 and the vehicle component 130 together.

In this example, the thermally insulating panel 100 extends between the powertrain component 120 and the vehicle component 130 such that it forms a thermal insulating layer between the powertrain component 120 and the vehicle component 130. The uncompressed area 104 of the thermally insulating panel 100 extends over at least a portion 122 of the powertrain component 120 to at least partially thermally insulate the powertrain component 120. The pre-compressed area 106 of the thermally insulating panel 100 extends between the powertrain component 120 and the vehicle component 130 such that it forms a thermal insulating layer between the powertrain component 120 and the vehicle component 130.

The pre-compressed area 106 of the thermally insulating panel 100 is located between the powertrain component 120 and the vehicle component 130.

In this example but not necessarily all examples, the powertrain component 120 comprises an aperture 121 that extends through the powertrain component 120 and is aligned sufficiently with the aperture 110 of the thermally insulating panel 100 to allow the fixing 140 to extend through both the aperture 121 and the aperture 110.

In this example but not necessarily all examples, the vehicle component 130 comprises an aperture 131 that extends through the vehicle component 130 and is aligned sufficiently with the aperture 110 of the thermally insulating panel 100 to allow the fixing 140 to extend through both the aperture 131 and the aperture 110.

In this example but not necessarily all examples, the thermally insulating panel 100 is the only thing between the powertrain component 120 and the vehicle component 130. If it were removed the powertrain component 120 and the vehicle component 130 would abut.

The fixing 140 joining the powertrain component 120 to the vehicle component 130 and extending through the aperture 110, may be thermally insulated to prevent a thermal bridge forming, when in use, through the fixing 140 between the powertrain component 120 and the vehicle component 130.

The fixing 140 may have a first contact surface 141 for contacting, in use, the powertrain component 120. The first contact surface 141 may be a thermally insulated surface. The fixing 140 may additionally or alternatively have a second contact surface 142 for contacting, in use, the vehicle component 130. The second contact surface 142 may be a thermally insulated surface.

In one example but not necessarily all examples, the fixing 140 comprises a bolt 144 comprising a head 145 and a shaft 146 with an external screw thread and a nut 148 comprising a threaded aperture 149 for receiving the thread of the bolt shaft 146. The powertrain component 120 and the vehicle component 130 are compressed between an abutment surface 142 of the head 145 of the bolt 144 and an opposing abutment surface 141 of the nut 148.

In some examples, the abutment surface 142 of the head 145 of the bolt 144 is thermally insulated. In some examples, the abutment surface 141 of the nut 148 is thermally insulated. In some examples, the shaft 146 of the bolt 144 is thermally insulated. Thermal insulation may, for example, be achieved by using a nylon or other coatings.

In FIGS. 2A and 2B, a gasket 150 is an integral part of the thermally insulating panel 100. In this example, the gasket 150 is embedded within (between) layers forming the thermally insulating panel 100.

In FIGS. 3A and 3B, a gasket 150 is an integral yet external part of the thermally insulating panel 100. In this example, the gasket 150 is attached, for example using adhesive, to a surface 105 of the thermally insulating panel 100.

In an alternative example, the thermally insulating panel 100 illustrated in FIG. 1A may be used in the vehicle system 200 illustrated in FIG. 3B, using a gasket 150 that is separate from the thermally insulating panel 100 and from the powertrain component 120 and the vehicle component 130.

The gasket 150 comprises a perimeter portion 152 that circumscribes (surrounds) an aperture 151. The aperture 151 may, but need not be, circular and circumscribe should be interpreted accordingly. The perimeter portion 152 of the gasket 150 has a depth that fills a space between the powertrain component and the vehicle component 130 and/or acts as a spacer to achieve a controlled spacing between the powertrain component 120 and the vehicle component.

The gasket 150 is located within the pre-compressed area 106 and its aperture 151 is in alignment with the aperture 110 such that the fixing 140 attaching the vehicle component 130 to the powertrain component 120 passes through the aperture 151 of the gasket 150 and the aperture 110.

In some but not necessarily all embodiments, the gasket 150 may be a rigid gasket that does not deform or does not deforming more than 2-10% under compression when in use.

In some but not necessarily all embodiments, the gasket 150 may be a thermally insulating gasket. For example, the perimeter portion 152 may be formed from rubber or nylon.

Figure 4B:
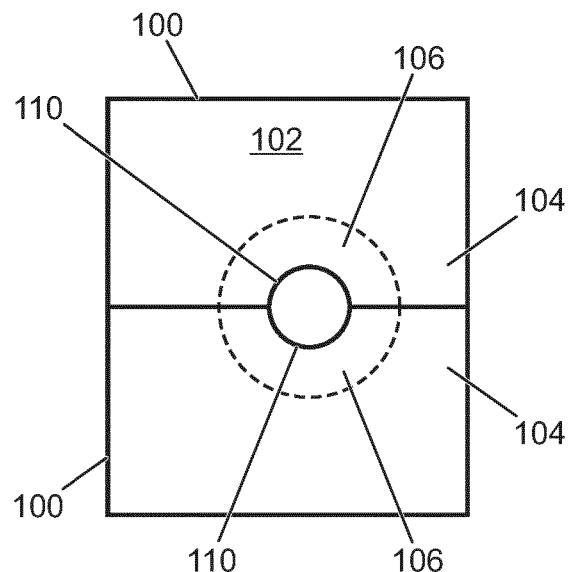

FIGS. 4A and 4B illustrated different examples of vehicle thermally insulating panels 100. In FIG. 4A the aperture 110 of the vehicle thermally insulating panels 100 is wholly within the pre-compressed area 106 of the vehicle thermally insulating panels 100. In FIG. 4B the aperture 110 is formed by a first edge of a first thermally insulating panel 100 and an opposing second first edge of a second thermally insulating panel 100. The first and second edges abut except at the aperture 110 where they separate to form the aperture 110. The first thermally insulating panel 100 forms only a part of the aperture 110 and the second thermally insulating panel 100 forms the other part of the aperture 110. Gaskets or parts of gaskets 150 may be attached to or embedded within the first thermally insulating panel 100 and/or the second thermally insulating panel 100

Figure 5:
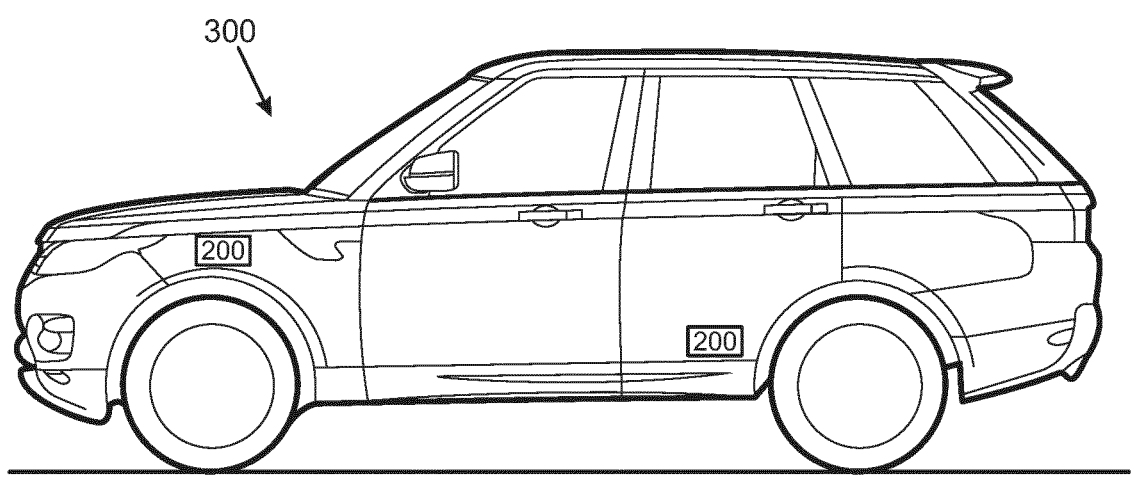
FIG. 5 illustrates an example of a vehicle comprising one or more thermally insulating panels.

FIG. 5 illustrates an example of a vehicle comprising a vehicle system 200, for example, as described in FIG. 1B, 2B or 3B.

Although the invention has particular application to engines, where, for example, one or both of the powertrain component 120 and the vehicle component 130 may be engine mounts, it also has application to other parts of a vehicle 300 such as the vehicle powertrain, those parts of the vehicle where high temperature oil is stored or used, and/or for maintaining the working temperature of a battery or another temperature sensitive component.

Consequently one or both of above-mentioned vehicle components, whether a powertrain component 120 or a vehicle component 130, may be, for example, an engine component, a vehicle powertrain component, an oil storage or oil circulation component, a temperature sensitive component, or an electrical energy storage component.

FIGS. 6, 7 and 8 illustrate different examples of how the thermally insulating panel 100 illustrated in FIG. 2A may be made. The method may be modified to make the thermally insulating panel 100 illustrated in FIG. 1A by leaving out the gaskets 150. The method may be modified to make the thermally insulating panel 100 illustrated in FIG. 3A by integrating the gaskets 150 externally instead of internally. In other examples, some gaskets 150 may be internally integrated and others externally integrated.

The FIGS. illustrate different methods of making a rigid, three-dimensional thermally insulating panel 100 that conforms at least partially to a shape of the powertrain component 120 and/or the vehicle component 130.

The thermally insulating panel 100 may be formed from a single layer or from multiple layers 160. The multiple layers 160 may be multiple laminate layers.

Examples of a suitable layer or layers 160 include: polyurethane foam, felt. The felt may be formed from glass fibres, natural fibres. Pressurized steam molding may be used to manufacture the thermally insulating panel 100.

The thermally insulating panel 100 may comprise an external rigid reinforcement layer 162 on one side of the thermally insulating panel 100 (FIG. 7) or on both sides of the thermally insulating panel 100 (FIG. 8). The thermally insulating panel 100 may comprise a cellular layer 160 and/or heat reflecting layer 160 on an interior side of one or both of the external rigid reinforcement panels 162.

A reinforcement layer 162 may be made from blended web of polyamide material in the form of powder or flakes and reinforcement fibres.

The thermally insulating panel 100 may be adapted for acoustic insulation as well as thermal insulation, for example, it may comprise a rigid layer such as a reinforcement layer 162 or a layer of material configured to absorb or reflect noise.

The term thermally insulating or thermally insulated when applied to something indicates that it does not easily transfer thermal energy via conduction, convention or radiation. In particular, thermally insulating or thermally insulated in the context of this document, when applied to something indicates that it does not easily transfer thermal energy via conduction or radiation, preventing or inhibiting a thermal bridge between the powertrain component and the vehicle component 120, 130 and providing insulation to reduce radiation from either the powertrain component or the vehicle component.

The term thermally insulating or thermally insulated in some but not necessarily all examples implies thermal transfer of less than 0.045 W/mK at 20° C. For comparison, steel is approximately 50 W/mK at 20° C. and aluminum is approximately 200 W/mK at 20° C.

The term 'heat sink' when used to describe a component is intended to refer to a component that operates as a heat sink in use and/or has the potential to operate as a heat sink in use. The term 'heat source' when used to describe a component is intended to refer to a component that operates as a heat source in use or has the potential to operate as a heat source in use. The powertrain component 120 and the vehicle component 130 may be, respectively a heat source and a heat sink. Alternatively, the powertrain component 120 and the vehicle component 130 may be, respectively a heat sink and a heat source.

In this document, the description of joining a powertrain component 120 to a vehicle component 130 is synonymous with joining the second vehicle component 130 to the powertrain component 120. Neither implies a direction or sense in which a fixing 140 is used.

The description of joining the second component 130 to the powertrain component 120 (or joining the powertrain component 120 to the vehicle component) does not require a direct abutting contact between the vehicle components 120, 130. However, in at least some embodiments direct abutting contact would occur or potentially occur in the absence of the thermally insulating panel 100 between the vehicle components 120, 130.

As used here 'module' refers to a unit or apparatus that excludes certain parts/components that would be added by an end manufacturer or a user. The thermally insulating panel 100 may be a module.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A system for a vehicle, comprising:
a powertrain component;
a vehicle component;
a fixing joining the powertrain component to the vehicle component;
a thermally insulating panel comprising at least one uncompressed area extending over at least a portion of the powertrain component to at least partially thermally insulate the powertrain component and at least one pre-compressed area extending between contacting points or surfaces of the powertrain component and the vehicle component such that the pre-compressed area forms a thermal insulating layer between the powertrain component and the vehicle component, wherein the pre-compressed area of the thermally insulating panel defines an aperture through which the fixing at least partially extends; and
a gasket integrated within or attached to a surface of the thermally insulating panel within the pre-compressed area in alignment with an aperture through the panel material in the pre-compressed area for receiving the fixing.

2. A thermally insulating panel, comprising
panel material configured to provide thermal insulation to a powertrain component, wherein the panel material comprises at least one uncompressed area and at least one pre-compressed area, wherein the pre-compressed area provides a rigid mounting position to mount a vehicle component to the powertrain component, the rigid mounting position to be located at a potential thermal bridge between the powertrain component and the vehicle component thereby thermally decoupling the powertrain component and the vehicle component; and
a gasket integrated within or attached to a surface of the thermally insulating panel within the pre-compressed area in alignment with an aperture through the panel material in the pre-compressed area for receiving a fixing for joining the powertrain component and the vehicle component.

3. The thermally insulating panel as claimed in claim 2, wherein the thermally insulating panel defines at least part of an aperture through the panel material in the pre-compressed area for receiving a fixing for joining the powertrain component and the vehicle component.

4. The thermally insulating panel as claimed in claim 2, wherein the gasket is a thermally insulating gasket.

5. The thermally insulating panel as claimed in claim 2, wherein the gasket is a non-deformable spacer for providing a controlled spacing between the powertrain component and the vehicle component.

6. The thermally insulating panel as claimed in claim 2, wherein the thermally insulating panel is formed from multiple layers.

7. The thermally insulating panel as claimed in claim 2, wherein the thermally insulating panel is a three dimensional rigid panel that conforms at least partially to a shape of at least one of the powertrain component and the vehicle component.

8. The thermally insulating panel as claimed in claim 2, comprising polyurethane foam and felt.

9. The thermally insulating panel as claimed in claim 2, comprising a rigid reinforcement layer at least partially covering at least one external side of the thermally insulating panel.

10. The thermally insulating panel as claimed in claim 2, wherein the panel is adapted for acoustic insulation.

11. The thermally insulating panel as claimed in claim 2, wherein the vehicle component is in contact with or coupled to the powertrain component.

12. A system comprising the thermally insulating panel as claimed in claim 2, a powertrain component; a vehicle component; a fixing joining the powertrain component to the vehicle component, the fixing at least partially extending through an aperture of the thermally insulating panel, wherein the powertrain component comprises a potential heat source and the vehicle component comprises a potential heat sink.

13. The system as claimed in claim 12, wherein the pre-compressed area of the thermally insulating panel at least partially extends between the powertrain component and the vehicle component such that the pre-compressed area forms a thermal insulating layer between the powertrain component and the vehicle component, the uncompressed area of the thermally insulating panel extending over at least a portion of the powertrain component to at least partially thermally insulate the powertrain component.

14. The system as claimed in claim 12, wherein the fixing joining the powertrain component to the vehicle component extends at least partially through the aperture and is thermally insulated to prevent a thermal bridge forming through the fixing between the powertrain component and the vehicle component.

15. The system as claimed in claim 12, wherein the fixing comprises at least one of a thermally insulated first contact surface configured for contacting the powertrain component and a thermally insulated second contact surface configured for contacting the vehicle component.

16. The system as claimed in claim 12, wherein thermal transfer between the powertrain component and the vehicle component is less than 0.045 W/mK at 20° C.

17. The system as claimed in claim 12, wherein the vehicle component is a component of an engine, a vehicle powertrain, a store for high temperature vehicle oil, a vehicle electrical energy storage device or a temperature-sensitive vehicle component.

18. A vehicle comprising a thermally insulating panel as claimed in claim 2.

19. A system comprising:
a powertrain component including or establishing a potential heat source;
a vehicle component including or establishing a potential heat sink;
a fixing joining the powertrain component to the vehicle component; and
a thermally insulating panel, comprising panel material configured to provide thermal insulation to the powertrain component,
wherein
the panel material comprises at least one uncompressed area and at least one pre-compressed area,
the pre-compressed area provides a rigid mounting position to mount the vehicle component to the powertrain component,
the rigid mounting position is located at a potential thermal bridge between the powertrain component and the vehicle component thereby thermally decoupling the powertrain component and the vehicle component,
the fixing at least partially extends through an aperture of the thermally insulating panel, and
the fixing includes at least one of a thermally insulated first contact surface contacting the powertrain component and a thermally insulated second contact surface contacting the vehicle component.

* * * * *